(12) United States Patent
Genick, II

(10) Patent No.: US 6,457,925 B1
(45) Date of Patent: Oct. 1, 2002

(54) BOLT RETAINING COMPRESSION LIMITER FOR SECURING WORKPIECES

(75) Inventor: Raymond M. Genick, II, Waterford, MI (US)

(73) Assignee: Bamal Corporation, Birmingham, MI (US)

( * ) Notice: Subject to any disclaimer, the term of this patent is extended or adjusted under 35 U.S.C. 154(b) by 0 days.

(21) Appl. No.: 09/844,093

(22) Filed: Apr. 27, 2001

(51) Int. Cl.[7] .................................................. F16B 21/18
(52) U.S. Cl. ........................ 411/353; 411/999; 411/339
(58) Field of Search ................................. 411/107, 352, 411/353, 970, 999, 338, 339

(56) References Cited

U.S. PATENT DOCUMENTS

| | | | |
|---|---|---|---|
| 1,251,676 A | | 1/1918 | McCaffray |
| 2,972,367 A | * | 2/1961 | Wootton |
| 3,041,913 A | * | 7/1962 | Liska |
| 3,093,179 A | * | 6/1963 | Zahodiain |
| 3,343,581 A | * | 9/1967 | Martin |
| 4,475,425 A | | 10/1984 | Punater et al. |
| 4,621,961 A | * | 11/1986 | Gulistan |
| 5,255,647 A | * | 10/1993 | Kickek |
| 5,275,135 A | | 1/1994 | Clemens et al. |
| 6,030,161 A | | 2/2000 | Udell et al. |
| 6,059,503 A | * | 5/2000 | Johnson |
| 6,174,118 B1 | * | 1/2001 | Rebers |
| 6,176,665 B1 | | 1/2001 | Bondarowicz et al. |

* cited by examiner

Primary Examiner—Flemming Saether
(74) Attorney, Agent, or Firm—Clark Hill PLC

(57) ABSTRACT

A compression limiting assembly minimizes compressive forces of a bolt being used to secure a first work piece to another work piece. The compression limiting assembly includes a longitudinal sleeve that defines a longitudinal axis extending between a first piece engaging end and a bore insertion end. The first piece engaging end includes a flange preventing the bolt from moving therepast. The longitudinal sleeve also includes a retainer portion defining a retainer portion inner diameter. The compression limiting assembly also includes a bolt retainer housed within the retainer portion of the longitudinal sleeve. The bolt retainer is adapted to receive the bolt therethrough to prevent the bolt from falling out of the longitudinal sleeve as the compression limiting assembly is being inserted into the first and second pieces. The bolt retainer defines a bolt retainer outer diameter larger than said retainer portion inner diameter. Engaging arms extend obliquely out from said bolt retainer to engage the retainer portion to help secure the bolt retainer therein.

16 Claims, 1 Drawing Sheet

BOLT RETAINING COMPRESSION LIMITER FOR SECURING WORKPIECES

BACKGROUND OF THE INVENTION

1. Field of the Invention

The invention relates to an assembly that limits compressive forces when fastening one workpiece to another. More specifically, the invention relates to a compression limiting assembly capable of retaining a fastener therein before securing one workpiece to another.

2. Description of the Related Art

Pieces of manufacture, commonly referred to as "workpieces," are often secured together in a manner where two workpieces are forced to abut each other. In the environment of the motor vehicle, these workpieces have to be secured together with sufficient force to prevent the fasteners from loosening due to the vibrations, temperature and driving surface conditions.

The technologies used to fabricate materials used in such environments are sophisticated. The materials are designed to provide the greatest amount of strength and add the least amount of weight. Sacrificed in this methodology is the ability to absorb stress forces. More specifically, a material that is designed to be the light weight and strong may sacrifice strength in terms of stress.

Stress is incurred in a workpiece when it is fastened to another workpiece. The stress on a workpiece in the area immediately adjacent the fastener may exceed the capabilities thereof resulting in a cracked workpiece. An example of two workpieces that are fabricated from sophisticated materials and are secured together in a volatile environment is the combination of the the upper and lower manifolds of an internal combustion engine. The upper and lower manifolds are secured together in a manner that perfect a seal therebetween. Therefore, enough compression must be made between the two workpieces to perfect the seal without providing too much compression such that the upper and lower manifolds crack under the stress.

One attempt to solve the problem is disclosed in the U.S. Pat. No. 6,030,161, issued to Udell et al. and Feb. 29, 2000. This patent discloses a captive bolt assembly. The captive bolt assembly includes a sleeve having a flange at its distal end thereof. A bolt, the fastener, includes a head portion and a threaded portion. A collar is secured to the bolt adjacent the head portion. The collar includes a retaining portion. The retaining portion engages the inner surface of the sleeve preventing the bolt from being removed from the sleeve. The flange at the end of the sleeve acts as a compression limiter preventing the bolt from being forced into a workpiece after the flange about the surface thereof. This reference discloses that compression limiter with a retention system for the bolt. This reference does not disclose, however, an assembly providing for a bolt retainer that allows the bolt to move axially with respect to the compression limiter.

Another reference disclosing a fastener for a manifold for an internal combustion engine is U.S. Pat. No. 5,275,135, issued to Clemens et al. on Jan. 4, 1994. This reference discloses a fastener for a molded workpiece, namely an intake manifold, to another portion of the intake manifold. The fastener includes a first threaded section and a second section extending beyond the first threaded section. The second section has a diameter greater than the second threaded section. The second section defines an annular shoulder surrounding the first threaded section. While the fastener has an annular shoulder that may act as a compression limiter, nowhere in this reference is there a disclosure of a means for securing the fastener to one of the two manifolds to create a retention of the fastener during the assembly thereof.

SUMMARY OF THE INVENTION

A compression limiting assembly minimizes the compressive forces of a bolt on a first workpiece being fastened to a second workpiece. The compression limiting assembly includes a longitudinal sleeve defining a longitudinal axis extending between a first piece engaging end and a bore insertion end. The first piece engaging end includes a flange that prevents a longitudinal sleeve from fully extending into the first workpiece. A bolt retainer is housed within the longitudinal sleeve. The bolt retainer is adapted to receive the bolt therethrough to prevent the bolt from falling out of the longitudinal sleeve as the compression limiting assembly is being inserted into the first and second workpieces.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 2:
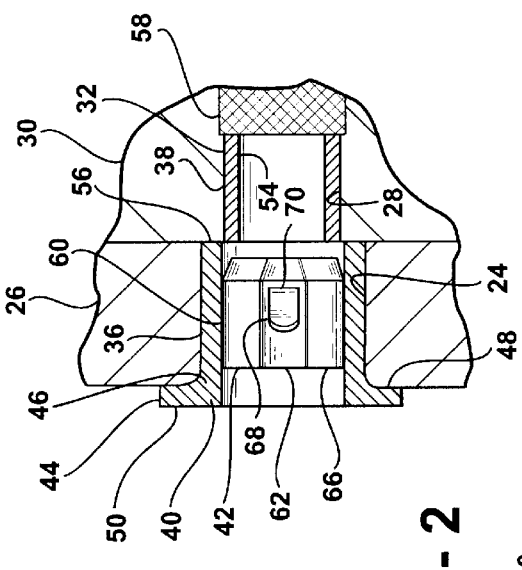
FIG. 2 is a side view, partially cut away, of one embodiment of the invention.
Figure 1:
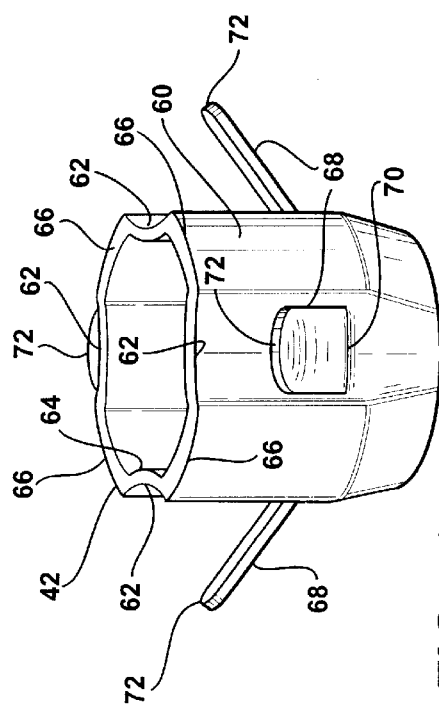
FIG. 1 is a perspective view of one embodiment of a bolt retainer incorporated into the invention.
Figure 3:
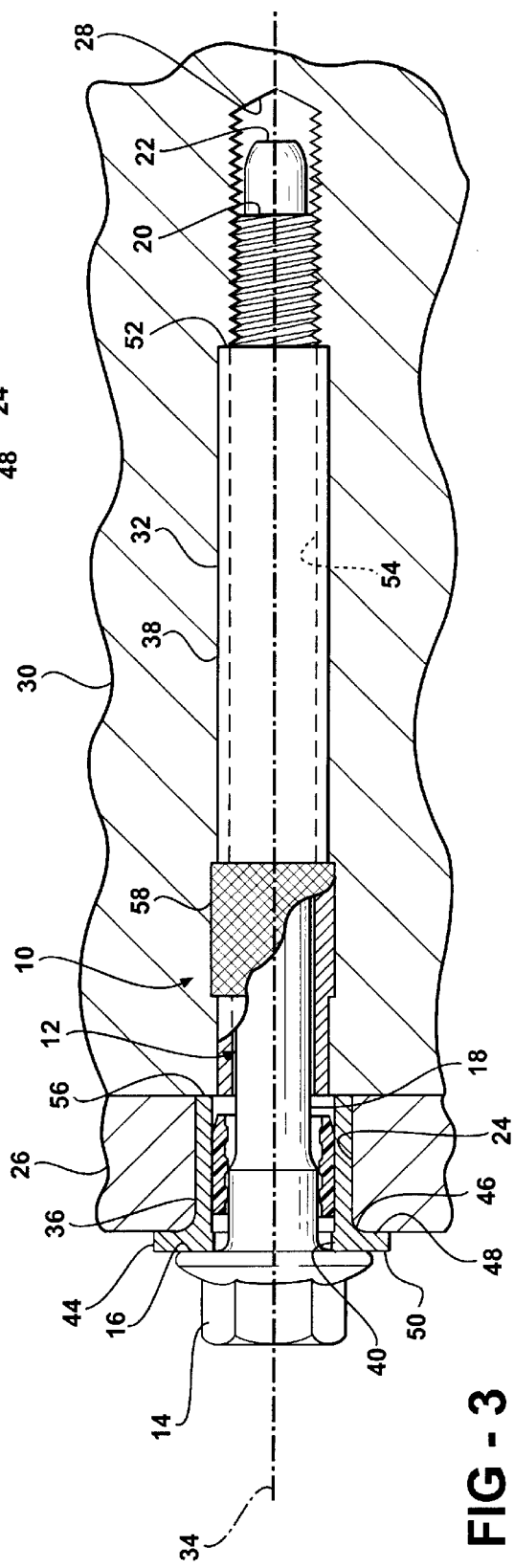
FIG. 3 is a side view, partially cut away, of one embodiment of the invention with a bolt secured within the workpieces.

Referring to the Figures, the invention, a compression limiting assembly, is generally indicated at 10. The compression limiting assembly 10 receives a bolt, generally shown at 12, therein. The bolt 12 includes a tool receiving head 14 having a workpiece abutment surface 16. The bolt 12 also includes a shaft 18 wherein at least a portion 20 of which is threaded. The shaft 18 extends from the workpiece abutment surface 16 to a shaft distal end 22.

The bolt 12 extends through a first bore 24 in a first workpiece 26 and a second bore 28 in a second workpiece 30. The second bore 28 includes a threaded portion that threadingly engages the bolt 12. In one embodiment, the first 26 and second 30 workpieces are upper and lower manifolds of an internal combustion engine for a motor vehicle (neither shown), respectively. It should be appreciated by those skilled in the art that the workpieces may be any two pieces that need to be secured to each other with a limitation on the compressive forces being applied by the bolt 12. The upper and lower manifolds have been set forth merely as examples and should not be construed as limiting.

Returning attention to the invention, the compression limiting assembly 10 includes a longitudinal sleeve 32. The longitudinal sleeve 32 defines a longitudinal axis 34. The longitudinal sleeve 32 has two portions, the retainer portion 36 and the second piece portion 38. The retainer 36 and second piece 38 portions are coaxial and extend along the longitudinal axis 34. The retainer portion 36 defines a retainer portion inner diameter, represented in the Figures by the retainer portion inner surface 40. The retainer portion 36 receives a bolt retainer 42 therein. The bolt retainer 42 will be discussed in greater detail subsequently. A flange 44 extends radially outwardly from a first piece engaging end 46 of the longitudinal sleeve 32. The flange 44 includes a positioning surface 48 that abuts against the first workpiece 26 and a fastener stop surface 50 that stops the workpiece abutment surface 16 of the tool receiving head 14 from moving therepast. The flange 44 also prevents the longitudinal sleeve from fully extending into the first workpiece 32.

The second piece portion 38 extends out from the retainer portion 36. The second piece portion 38 extends axially out to a bore insertion end 52 of the longitudinal sleeve 32 and defines a second piece inner diameter, represented in the Figures by a second piece inner surface 54. The second piece inner diameter is slightly greater than the outer diameter of the threaded portion 20 of the shaft 18. The second piece portion 38 does not have a threaded surface and does not engage the threads 20 of the bolt 12.

A compression stop surface 56 extends between the retainer portion 36 and the second piece portion 38. The compression stop surface 56 extends perpendicularly to the longitudinal axis 34 therebetween. The compression stop surface 56 works in combination with the fastener stop surface 50 to prevent compressive forces from being too great on the first workpiece 26.

The second piece portion 38 also includes a knurl portion 58. The knurl portion 58 extends out beyond the outer diameter of the second piece portion 38 to positively engage the second bore 28 of the second workpiece 30.

The bolt retainer 42 is received by and is housed within the retainer portion 36 of the longitudinal sleeve 32. The bolt retainer 42 is adapted to receive the bolt 12 therethrough and prevents the bolt 12 from falling out of the longitudinal sleeve 32 as the compression limiting assembly 10 is being inserted into the first 26 and second 30 workpieces.

The bolt retainer 42 defines a bolt retainer outer diameter, represented in the Figures by a bolt retainer outer surface 60. The bolt retainer outer diameter is larger than the retainer portion inner diameter such that the bolt retainer 42 is secured to the longitudinal sleeve 32 within the retainer portion 36 thereof. The diameter difference is large enough to create a friction fit between the bolt retainer 42 and the longitudinal sleeve 32. The bolt retainer 42, being fabricated from a thermoplastic, is compressed slightly when press fit into the retainer portion 36.

When viewing the bolt retainer outer surface 60, the bolt retainer 42 includes two sets of sections. The first is a set of concave sections 62. From the perspective of looking at the bolt retainer 42 in the side view, as shown in FIG. 2, each of the concave sections 62 define a curvature that reduces the inner diameter 64 of the bolt retainer 42. While any number of concave sections 62 may be used, the preferred embodiment of the invention 10 incorporates four concave sections 62.

Separating each of the four concave sections 62 is a convex section 66. More specifically, each of the concave sections 62 is joined to two convex sections 66. The set of convex sections 66 defines the outer diameter of the bolt retainer 42. It is the convex sections 66 that engage the retainer portion inner surface 40 to secure the bolt retainer 42 within the longitudinal sleeve 32.

Likewise, it is the concave sections 62 that define the inner diameter of the bolt retainer 42. The concave sections 62 engage and hold the bolt 12 within the bolt retainer 42 and, hence, the compression limiting assembly 10.

The bolt retainer 42 also includes a plurality of engaging arms 68. In the preferred embodiment, there are four engaging arms 68, one extending obliquely out from each of the concave sections 62. The engaging arms 68 extend out from the concave sections 62 to prevent undue stress on the point of extension 70, the point of which the engaging arms 68 extend out from the bolt retainer 42. In addition, the engaging arms 68 extend out from the concave sections 62 at an angle so distal ends 72 thereof may engage the retainer portion inner surface 40 to further secure the bolt retainer 42 within the longitudinal sleeve 32. The distal ends 72 are curved in the preferred embodiment.

As stated above, the bolt retainer 42 is formed of a thermoplastic material. The material allows the bolt 12 to be inserted therethrough. Because the concave sections 62 define an inner diameter of the bolt retainer 42 that is smaller than the outer diameter of the threaded portion 20 of the shaft 18, the bolt 12 cannot move freely with respect to the bolt retainer 42. The bolt 12 can move within the bolt retainer 42 if a force outside therefrom was applied thereto. The friction force between the bolt retainer 42 and the bolt 12 is, however, sufficient to prevent gravity from moving the bolt 12 with respect to the bolt retainer 42.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A compression limiting assembly for minimizing compressive forces of a bolt on a first work piece being fastened to a second work piece, said compression limiting assembly comprising:

a longitudinal sleeve defining a longitudinal axis extending between a first piece engaging end and a bore insertion end, said first piece engaging end including a flange preventing the bolt from moving therepast, said longitudinal sleeve including a retainer portion defining a retainer portion inner diameter, a second piece portion extending through a portion of a bore in the second piece and defining a second piece inner diameter less than said retaining portion inner diameter, and a compression stop surface extending perpendicularly to said longitudinal axis between said retainer portion and said second piece portion;

a bolt retainer housed within said longitudinal sleeve, said bolt retainer adapted to receive the bolt therethrough to prevent the bolt from falling out of said longitudinal sleeve as said compression limiting assembly is being inserted into the first and second pieces; and a knurled surface extending around a portion of said second piece portion.

2. A compression limiting assembly as set forth in claim 1 wherein said bolt retainer defines a bolt retainer outer diameter larger than said retainer portion inner diameter such that said bolt retainer is secured to said longitudinal sleeve within said retainer portion thereof.

3. A compression limiting assembly as set forth in claim 2 wherein said bolt retainer includes engaging arms extending out from said bolt retainer to engage said retainer portion to further secure said bolt retainer therein.

4. A compression limiting assembly as set forth in claim 3 wherein aid engaging arms extend out from said bolt retainer obliquely thereto.

5. A compression limiting assembly as set forth in claim 4 wherein said bolt retainer includes a plurality of concave sections.

6. A compression limiting assembly as set forth in claim 5 wherein said bolt retainer includes a plurality of convex sections.

7. A compression limiting assembly as set forth in claim 6 wherein each of said plurality of concave sections is juxtaposed each of said convex portions.

8. A compression limiting assembly as set forth in claim 7 wherein each of said plurality of engaging arms extend out of each of said plurality of concave portions.

9. A compression limiting assembly as set forth in claim 8 wherein each of said engaging arms extends out to a distal end.

10. A compression limiting assembly as set forth in claim 9 wherein said distal end is curved.

11. A compression limiting assembly for minimizing compressive forces of a bolt on a first work piece being fastened to a second work piece, said compression limiting assembly comprising:

a longitudinal sleeve defining a longitudinal axis extending between a first piece engaging end and a bore insertion end, said first piece engaging end including a flange preventing the bolt from moving therepast, said longitudinal sleeve including a retainer portion defining a retainer portion inner diameter; and a bolt retainer housed within said retainer portion of said longitudinal sleeve, said bolt retainer adapted to receive the bolt therethrough to prevent the bolt from falling out of said longitudinal sleeve as said compression limiting assembly is being inserted into the first and second pieces, said bolt retainer defining a bolt retainer outer diameter larger than said retainer portion inner diameter and including engaging arms extending out from said bolt retainer to engage said retainer portion to further secure said bolt retainer therein.

12. A compression limiting assembly as set forth in claim 11 including a second piece portion defining a second piece inner diameter less than said retaining portion inner diameter, said second piece portion extending through a portion of a bore in the second piece.

13. A compression limiting assembly as set forth in claim 12 including a compression stop surface extending perpendicularly to said longitudinal axis between said retainer portion and said second piece portion.

14. A compression limiting assembly as set forth in claim 13 wherein aid engaging arms extend out from said bolt retainer obliquely thereto.

15. A compression limiting assembly as set forth in claim 14 wherein said bolt retainer includes a plurality of concave sections.

16. A compression limiting assembly for minimizing compressive forces of a bolt on a first work piece being fastened to a second work piece, said compression limiting assembly comprising:

a longitudinal sleeve defining a longitudinal axis extending between a first piece engaging end and a bore insertion end, said first piece engaging end including a flange preventing the bolt from moving therepast, said longitudinal sleeve including a retainer portion defining a retainer portion inner diameter; and a bolt retainer housed within said retainer portion of said longitudinal sleeve, said bolt retainer adapted to receive the bolt therethrough to prevent the bolt from falling out of said longitudinal sleeve as said compression limiting assembly is being inserted into the first and second pieces, said bolt retainer defining a bolt retainer outer diameter larger than said retainer portion inner diameter and including engaging arms extending obliquely out from said bolt retainer to engage said retainer portion to further secure said bolt retainer therein.

* * * * *